Sept. 20, 1927. F. A. FAIRBROTHER Re. 16,741

JEWELRY COMPONENT

Original Filed May 7, 1923

INVENTOR.
Frederic A. Fairbrother.
BY Barlow & Barlow
ATTORNEYS.

Reissued Sept. 20, 1927. Re. 16,741

UNITED STATES PATENT OFFICE.

FREDERIC A. FAIRBROTHER, OF PROVIDENCE, RHODE ISLAND.

JEWELRY COMPONENT.

Original No. 1,566,845, dated December 22, 1925, Serial No. 637,075, filed May 7, 1923. Application for reissue filed August 4, 1927. Serial No. 210,686.

My invention relates to a jewelry component or finding adapted for embodiment in the manufacture of ornaments or jewelry and capable of being made up into different ornamental forms, according to the desire of the jeweler or his customers.

The present invention embodies a component having a relatively rigid body portion with a plurality of faces or sides and which may be ornamented in any desired manner and an end portion or portions of less cross sectional area than the rigid portion and freely bendable in all directions so that the components may be readily made up into the desired ornaments or articles of ornamental form, with or without gems or the like.

The present invention in one of its many forms is clearly illustrated in the accompanying drawings, which, with the numerals of reference marked thereon forms a part of the specification, and in which,—

Like reference characters indicate like parts throughout the views.

Figure 1:
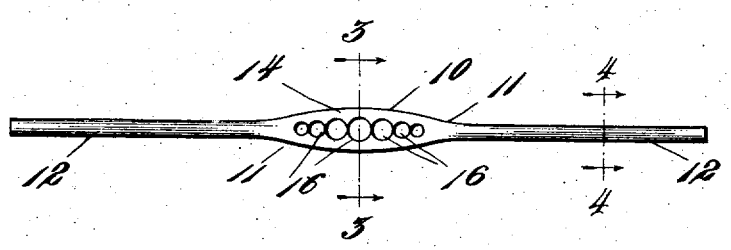
Fig. 1 is a front elevation of one form of my novel component.
Figure 2:
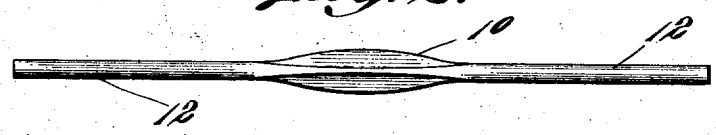
Fig. 2 is a rear elevation of the same.
Figure 3:
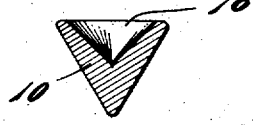
Fig. 3 is a cross-section on the line 3—3 of Fig. 1.
Figure 4:
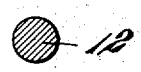
Fig. 4 is a cross-section on the line 4—4 of Figure 1.

In the construction illustrated my component is of metal, preferably precious metal plated, comprising a relatively rigid or semi-rigid body portion 10 having an end portion or portions 11, each tapering to a freely pliable portion 12. The latter, as illustrated, are preferably cylindrical, which is most suitable for bending in all directions or entwining into desired designs, while the portion 10 is herein shown as being angular in cross section, but which may be made in any desired shape.

The front or face 14 of the portion 10 is shown as being provided with a longitudinal series of cavities 16. In this instance the central cavity is the largest, and the remaining cavities gradually diminish in size toward the ends of the series. The front face is adapted to hold gems such as pearls, imitation gems or enamel or the like and the cavities are herein shown as holding embedded gems. The component is preferably made of one piece of metal and by reason of the greater relatively extended width of the body portion as well as its angular cross-sectional shape assures relatively great mechanical strength thereto and when this component is combined with other units, further stiffening may be secured by having that part of the component adjacent to other units attached to each other preferably by solder, as shown in the article illustrated in Figure 5.

Figure 5:
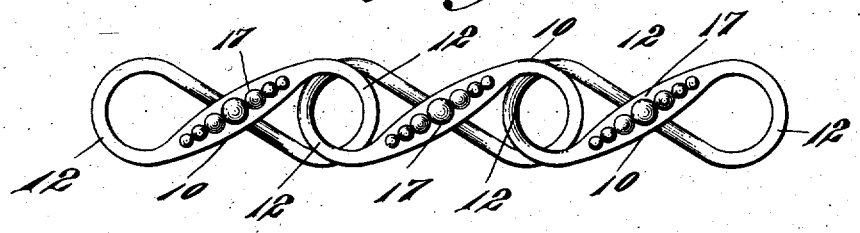
Fig. 5 is a front elevation of one of the many forms of jewelry articles that can be made from my components.

In Fig. 5 is shown in front elevation one article of jewelry which may be formed by bending, interengaging and soldering together, three of my components. In this showing gems or other ornaments 17 are mounted in the cavities 16.

It will be observed that the rigidity and relative amplitude of the portion 10 is particularly adapted to forming the ornamental portion of any ultimate structure, while the relatively reduced portions 12 are, because of their relative size or pliability, adapted to facile bending to assume any desired or required form.

The construction thus allowing any desired irregularity to the shape of the body portion to be offset or counterbalanced in the final form by properly arranging the pliable portions to obtain the general contour desired.

No particular method of making this component is claimed, as any method usual in making jewelry or similar articles may be employed. For economy in the use of material and for facility in constructing jewelry it is preferable that the component be made of one piece of metal, but it may be made of more than one piece if desired.

The size of the body portion relative to the size of the pliable portions may be of any proportion that will best secure the desired artistic or ornamental appearance.

The economy in the use of material has been noted in the structure of the portion 10; it will be noted that the interengaging portions 10 and 12 in the same component as shown in Figure 5, will substantially strengthen both portions thereof, thereby requiring the use of less material in the component. The component has been illustrated with plain surfaces, but it may be given any ornamental configuration that will not impair its functions or structure. Only a single unit or section of my component is herein shown, but it will be understood that the unit shown may be repeated in a length of stock of indefinite extent or units of jewelry of other designs may be formed by the use of my components. In other words, the component is obviously capable of forming either singly or in combinations or in various combinations numerous and varied ornamental articles, and the structure shown in Fig. 5 is more suggestive than typical.

Having thus described one illustrative embodiment of my invention, it is understood that the specific terms are used in a descriptive sense only, and are not for the purpose of limitation, the scope of the invention being defined by the appended claims.

I claim:

1. As an improved article of manufacture, a jewelry component made from a metal adapted to the jewelry art, comprising a pliable end portion substantially circular in cross-section and an ornamental body portion comparatively rigid and having a plurality of faces of greater cross-sectional area than the end portion, the latter being freely bendable in all directions to cooperate in conjunction with the body portion to make various articles of jewelry.

2. As an improved article of manufacture, a jewelry component composed of metals commonly used in the jewelry art, comprising a member with end portions substantially circular in cross-section and tapered and freely pliable in all directions, said member having an extended surface for ornamentation and relatively larger in cross-section than the end portions and transversely relatively rigid, the component being adapted for making articles of jewelry and ornamental objects of similar construction.

3. As an improved article of manufacture, a jewelry component composed of a metal adapted to the jewelry art, comprising a substantially rigid portion having means for holding gems and a tapered portion at one end thereof, freely pliable in all directions, the rigid portion having a plurality of faces and being of greater cross area than the end portion, and applicable in making jewelry or similar ornaments.

4. As an improved article of manufacture, a component made of a metal adapted to the jewelry art, comprising a substantially rigid portion formed to receive ornamentation, a tapered portion at the end thereof, and an end portion joined to the rigid portion by said tapered portion, the end portion being freely bendable in all directions and the rigid portion having a plurality of faces and applicable to cooperate with other components in making jewelry and articles of similar construction.

5. As an article of manufacture, an ornament composed of metals adapted to the jewelry art, comprising a substantially rigid body portion having a plurality of faces, a tapering portion at an end thereof, and an end portion joined to the rigid portion by said tapering portion, the end portion being freely bendable in all directions and being bent or folded back upon said body portion to form therewith an ornamental figure and to stiffen and support the whole.

FREDERIC A. FAIRBROTHER.